US011176492B2

(12) United States Patent
Chowdhary et al.

(10) Patent No.: US 11,176,492 B2
(45) Date of Patent: *Nov. 16, 2021

(54) TRAINING A MACHINE TO AUTOMATE SPOT PRICING OF LOGISTICS SERVICES IN A LARGE-SCALE NETWORK (71) Applicant: International Business Machines Corporation, Armonk, NY (US)

(72) Inventors: Pawan R. Chowdhary, San Jose, CA (US); Markus R. Ettl, Ossining, NY (US); Roger D. Lederman, Briarcliff Manor, NY (US); Tim Nonner, Zurich (CH); Ulrich B. Schimpel, Neuheim (CH); Zhengliang Xue, Yorktown Heights, NY (US); Hongxia Yang, Anaheim, CA (US)

(73) Assignee: International Business Machines Corporation, Armonk, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/352,958

(22) Filed: Mar. 14, 2019

(65) Prior Publication Data

US 2019/0213500 A1 Jul. 11, 2019

Related U.S. Application Data (63) Continuation of application No. 15/340,548, filed on Nov. 1, 2016, now Pat. No. 10,332,032.

(51) Int. Cl.
*G06N 20/00* (2019.01)
*G06Q 10/08* (2012.01)
*G06Q 30/02* (2012.01)

(52) U.S. Cl.
CPC ............. *G06N 20/00* (2019.01); *G06Q 10/08* (2013.01); *G06Q 30/02* (2013.01)

(58) Field of Classification Search
CPC ......... G06N 20/00; G06Q 10/08; G06Q 20/02
See application file for complete search history.

(56) References Cited

U.S. PATENT DOCUMENTS 7,363,271 B2  4/2008 Morimoto
7,386,519 B1  6/2008 Delurgio et al.
(Continued)

FOREIGN PATENT DOCUMENTS

CN  103455578 A  12/2013
WO  2008027287 A2  3/2008
WO  2014178055 A1  11/2014

OTHER PUBLICATIONS

Dhillon, I.S., "Information-Theoretic Co-Clustering", SIGKDD '03, Aug. 24-27, 2003, pp. 89-98.
Lee, Y., et al., "Generalized Linear Models with Random Effects Unified Analysis via H-likelihood", Chapman and Hall/CRC, Monographs on Statistics & Applied Probability 106, Jul. 13, 2006, 6 pages.
(Continued)

*Primary Examiner* — Tsu-Chang Lee
(74) *Attorney, Agent, or Firm* — Scully, Scott, Murphy & Presser, P.C.; Joseph Petrokaitis (57) ABSTRACT A machine learning algorithm is trained to learn to cluster a plurality of original-destination routes in a network for transporting cargo into a plurality of clusters based on similarities of the original-destination routes, and to learn to cluster the plurality of clusters into a plurality of subgroups based on customer behavior. Influencing criteria associated with each of the subgroups may be determined and based on the influencing criteria, a price elasticity curve for each of the subgroups may be generated. Based on the price elasticity curve and current network traffic, cargo transportation price associated with each of the subgroups may be determined.

20 Claims, 7 Drawing Sheets

(56) References Cited

U.S. PATENT DOCUMENTS

| | | | |
|---|---|---|---|
| 7,437,323 | B1 | 10/2008 | Valkov et al. |
| 7,958,025 | B2 | 6/2011 | Smith et al. |
| 8,700,500 | B2 | 4/2014 | Podgurny et al. |
| 8,738,421 | B1 | 5/2014 | Ali |
| 2001/0014868 | A1* | 8/2001 | Herz ............... G06Q 30/02 705/14.38 |
| 2003/0163332 | A1 | 8/2003 | Podgurny et al. |
| 2008/0134205 | A1* | 6/2008 | Bansal ........... G06F 11/3447 719/315 |
| 2009/0234710 | A1* | 9/2009 | Belgaied Hassine ................... G06Q 30/0206 705/7.29 |
| 2013/0159059 | A1 | 6/2013 | Malov |
| 2013/0304515 | A1* | 11/2013 | Gryan ............... G06Q 40/08 705/4 |
| 2014/0149321 | A1* | 5/2014 | Laumanns ....... G06Q 30/0284 705/417 |
| 2014/0310067 | A1 | 10/2014 | Ekholm |
| 2015/0235143 | A1* | 8/2015 | Eder ................. G16Z 99/00 706/12 |
| 2015/0363805 | A1 | 12/2015 | Tibau-Puig et al. |

OTHER PUBLICATIONS

Lee, Y., et al., "Hierarchical Generalized Linear Models", Journal of the Royal Statistical Society, 1996, Accessed on Oct. 14, 2016, pp. 619-678, Series B (Methodological), vol. 58, No. 4.

Nadif, M., et al., "Block clustering with mixture model: comparison of different approaches", Applied Stochastic Models and Data Analysis (ASMDA), May 2005, pp. 463-471.

Phillips, R.L., "Pricing and Revenue Optimization", Standford Business Books, Standford University Press, Aug. 5, 2005, 7 pages.

Talluri, K., et al., "An Analysis of Bid-Price Controls for Network Revenue Management", Management Science, Nov. 1998, p. 1577-1593, vol. 44, No. 11, Part 1 of 2.

Talluri, K., et al., "The Theory and Practice of Revenue Management", Springer, Springer Science & Business Media, Jun. 17, 2004, 12 pages.

Xu, H., et al., "Maximizing Revenue with Dynamic Cloud Pricing: The Infinite Horizon Case", IEEE ICC 2012 Next-Generation Networking Symposium, Jun. 2012, pp. 2929-2933.

List of IBM Patents or Patent Applications Treated as Related, dated Mar. 14, 2019, 2 pages.

* cited by examiner

TRAINING A MACHINE TO AUTOMATE SPOT PRICING OF LOGISTICS SERVICES IN A LARGE-SCALE NETWORK

BACKGROUND

The present application relates generally to computers and computer applications, and more particularly to cargo logistics and load balancing based on data and machine learning.

Pricing of air cargo depends on a mix of long term contracts and spot market pricing. At present the spot pricing is performed manually or based on standard rate sheet. Each pricing request may include pricing for several routes with large number of variability. The combination of routing network and large number of variables for each spot pricing request renders the problem very complex. At present there is a lack of off-the-shelf system tools for spot pricing at the necessary scale.

BRIEF SUMMARY

A method and system of training a machine to automate spot pricing of logistics services may be provided. The method, in one aspect, may include receiving a plurality of original-destination routes in a network for transporting cargo. The method may also include clustering the plurality of original-destination routes into a plurality of clusters based on similarities of the original-destination routes. The method may further include clustering the plurality of clusters into a plurality of subgroups based on customer behavior, wherein a machine learning algorithm is trained to learn to perform the clustering and the steps of clustering are performed by executing the machine learning algorithm. The method may also include determining influencing criteria associated with each of the subgroups. The method may further include, based on the influencing criteria, generating a price elasticity curve for each of the subgroups. The method may also include, based on the price elasticity curve and current network traffic, determining cargo transportation price associated with each of the subgroups.

A system of training a machine to automate spot pricing of logistics services, in one aspect, may include at least one hardware processor. A display device may be coupled to the hardware processor. The hardware processor may be operable to receive a plurality of original-destination routes in a network for transporting cargo. The hardware processor may be further operable to learn to train itself to cluster the plurality of original-destination routes into a plurality of clusters based on similarities of the original-destination routes. The hardware processor may be further operable to learn to train itself to cluster the plurality of clusters into a plurality of subgroups based on customer behavior. The hardware processor may be further operable to determine influencing criteria associated with each of the subgroups, and based on the influencing criteria, generate a price elasticity curve for each of the subgroups. The hardware processor may be further operable to, based on the price elasticity curve and current network traffic, determine cargo transportation price associated with each of the subgroups. The hardware processor may be further operable to visually display the subgroups in a graphical user interface on the display device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and computer program product that implements an automated pricing engine for spot pricing, for example, including live price quotes for all the routers of each origin-destination (O-D) pair in a global logistics network may be provided. In one aspect, price solutions may be contingent on the traffic and material flows in the network.

In one aspect, a network-based O-D clustering and quote segmentation algorithms are generated to solve the complexity and scale of the spot pricing. In another aspect, demand shaping is performed through the network in that price solutions are contingent on the traffic and material flows in the network. The system and method may handle the service complexity with the scale of global logistics network.

Figure 5:
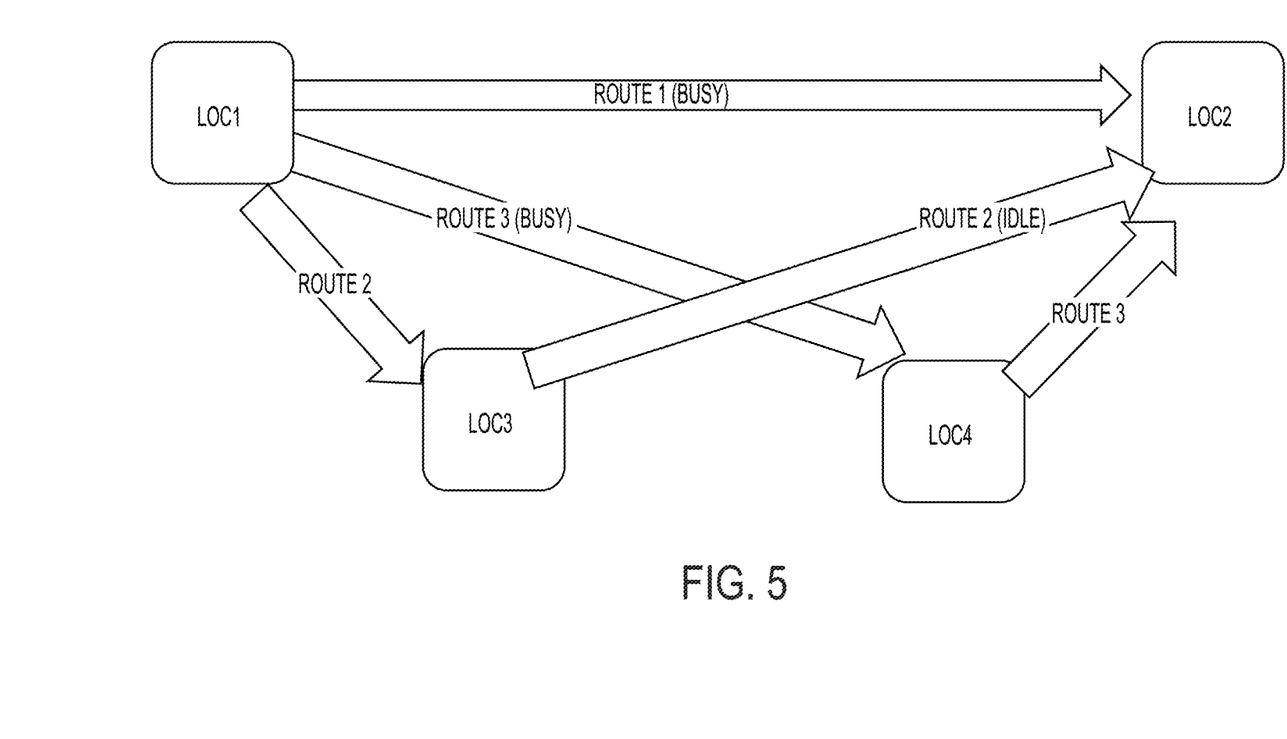
FIG. 5 illustrates an example of multiple routes that may be considered in cargo pricing in one embodiment of the present disclosure.

An automated solution may be provided for pricing spots quotes in a logistics market. For example, cargo product specialties include complexities such as weight, density, special handling requirement, and flexibility of capacity utilization. Existing solutions, e.g., server configuration pricing, do not handle the large scale logistics network, for example, in the presence of many routes where they have unbalanced traffic and where little historical data is available. Multi-route pricing may price multiple routes based on service requests and traffic congestions. Marginal opportunity cost may be estimated based on network utilization and flow balance. For example, FIG. 5 shows a simple example of multiple routes considered in cargo pricing in one embodiment of the present disclosure. A carrier may view optimal price by route. Low prices may be available for certain arrival date, while large premium may be added on next-day arrival. Route-based pricing may also lead to premiums or discounts on specific hubs, freighter capacity, special handling, fresh product, and/or other factors.

Automated pricing for air cargo service network has technical challenges, for example, for the following reasons. Air cargo pricing is difficult to automate because of simultaneous challenges of scale and complexity. For example, 30,000 plus OD requires robust automation of calibration and model selection steps. In contrast to passenger travel, each quote of cargo contains a unique combination of weight, volume, shape, density, and other factors, and involves unique competitive dynamics in each market based on routing and capacity of different carriers. Another challenge is jointly pricing a variety of routes with uncertain status of demand-capacity balance through the network. In most cases, very little historical data is available for a specific combination of market, customer, and quote type.

Figure 1:
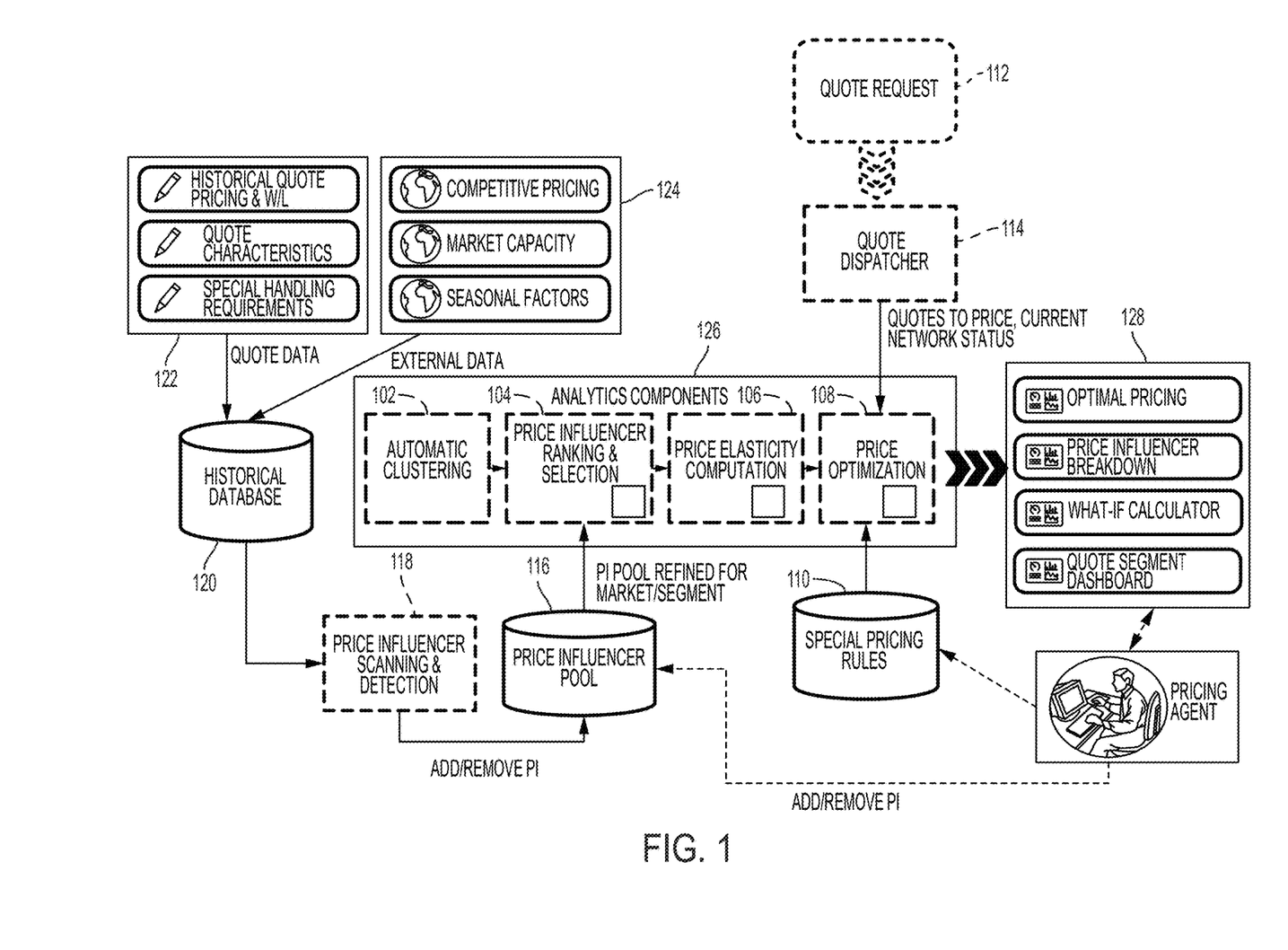
FIG. 1 is a diagram showing system architecture in one embodiment of the present disclosure.

FIG. 1 is a diagram showing system architecture in one embodiment of the present disclosure. Analytics components 126 may execute on one or more hardware processors. Automatic clustering 102 may include OD co-clustering and quote clustering. Many ODs have too few quotes to be able to derive a price elasticity curve. OD co-clustering in one embodiment of the present disclosure may include grouping similar ODs into one cluster. Such clustering also improves runtime performance of a computer system. ODs and OD clusters may contain large range of quote requests that prevent a good fit for a single price elasticity curve. Quotes may be differentiated by weight, volume, urgency, number of pieces, and a variety of special handling requirements, along with seasonal, market, and customer characteristics. Quote clustering in one embodiment of the present disclosure may include isolating subgroups of quotes with homogenous customer behavior. For example, customers within a cluster have a similar price threshold, and value a similar set of quote features. The subgroups are referred to as "quote clusters".

Automatic clustering 102 may receive as input OD data such as different routes, historical quotes associated with transporting cargo via those routes.

In a hierarchical logistic regression model (HLRM), the automatic clustering 102 may include fitting quote data to observed win probability, while addressing dependency in clustered data (e.g., competitiveness of OD pairs). The OD effect µ on win probability provides a scientific effect on win/loss that is computed from the data. The OD effect µ is a specific effect that shifts the win probability curve either up or down.

Logit $\{E'(y_{ijk})\} = X_{ijk}\beta_{ij} + Z_{ijk}u_{ij} + \varepsilon_{ijk}$ (1) $y_{ijk}$: win or loss for quote k, (2) $\beta_{ij}$: common effects on the cargo attributes, including for example, Chargeable Weight (CWT), Volume (VOL).

(3) $u_{ij}$: OD pair effect for original (ORIG)=i and destination (DEST)=j. E represents "Expectation", a standard term in probability.

X is vector of attributes for quote k. Z has a value of 0 or 1 represents an indicator mapping k to the OD, represented by the pair (i,j).

ε is a random noise term.

This step initially fits all quotes using a single model, where µ captures deviation of OD from that universal model. The next step clusters OD for similar µ.

Figure 2:
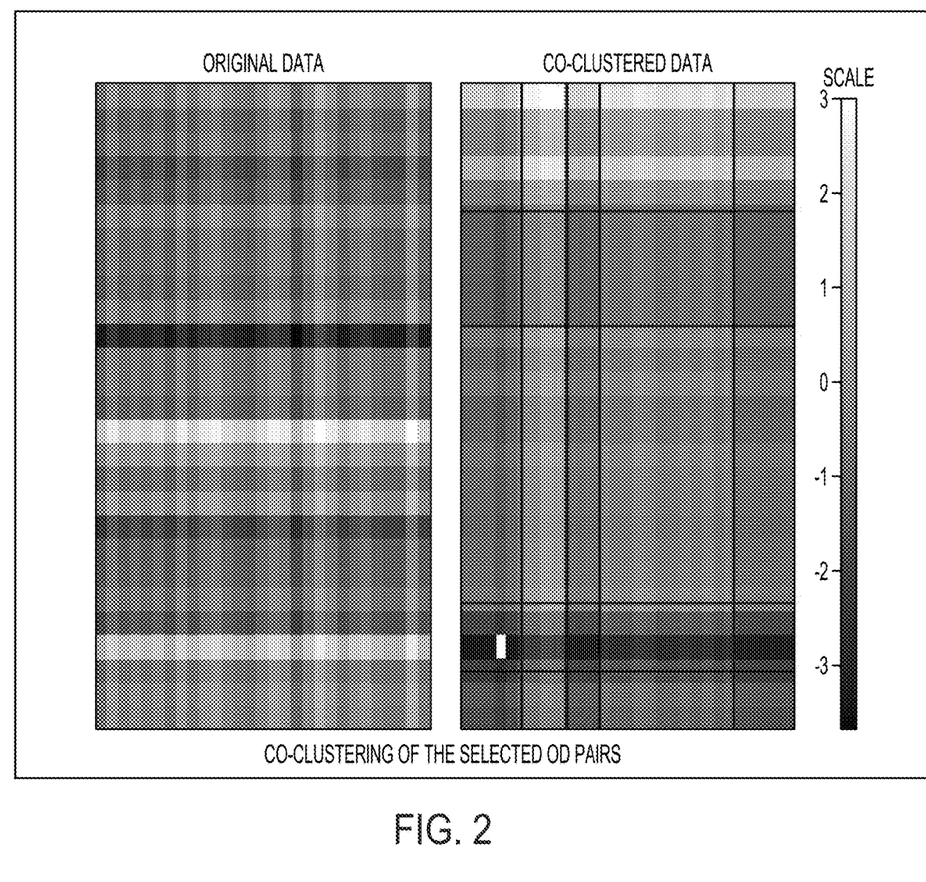
FIG. 2 shows a visual graphics example of co-clustered data in one embodiment of the present disclosure.

OD co-clustering in one embodiment evaluates permutations of origin and destination in order to draw a correspondence structure (e.g., pattern recognition) for the most similar effects, e.g., a specific effect that shifts the win probability curve. Automatic clustering 102 co-clusters the OD pairs based on the market effect µ. FIG. 2 shows a visual graphics example of co-clustered data. Such graphics may be rendered on a graphical user interface, allowing users to be able to view the clusters, for example, displayed on a dashboard.

Quote clustering may include merging a decision tree learning (CART) algorithm with custom logic to create interplay between segmentation and regression.

Price influence ranking and selection 104 may include variable selection. Variable selection finds relevant price influencers for each quote cluster without over-fitting by automatically filtering most important price influencers from a pool of influencers 116 via LASSO technique and cross-validation. LASSO is an established method that will eliminate variables that are not useful predictors in the model. This technique fits a logistic regression model with an extra penalty placed on the size of each parameter so parameters will minimize penalty by shrinking to zero when not important from prediction. Another method to determine the most important price influencers is to remove variables that do not show impact statistically through their p-value in the regression. In one embodiment, the methodology of the present disclosure may perform both of these methods at each node of the CART tree and then evaluate each node according to rule-based checks that ensure the model is within a range of user expectations. The methodology of the present disclosure in one embodiment uses this rule selection to select the best nodes to include in the clustering. These rule requirements may function as a third criterion for variable selection (determining the most important price influencers).

Examples of price influencers may include, but are not limited to, CWT, leadtime, number of pieces, number of stops, historical win rates, type of consumers, type of products, type of freights, competition, seasonality, and week-end effects. Price influencers may be correlated, e.g., CWT and number of pieces, freighter and week-end. L-1 penalized method (LASSO) may be executed to reduce correlation, and a p-value threshold may be executed to filter out statistically insignificant price influencers.

The pool of influencers 116 may be retrieved from a database or storage device, and may include price influencer refined for market or segment. For example, a price influencer scanning and detection component 118 executing on a hardware processor may determine from a historical database 120 the price influencers to add or remove, and generate the price influencer pool 116. The price influencer scanning and detection component 118 may extract all potential influencers from available data to use a starting point for automated selection. The historical database 120 may store quote data 122 such as historical quote pricing and win/loss associated with the historical quote pricing, quote characteristics and special handling requirements, and external data 124 such as competitive pricing, market capacity and seasonal factors. The price influencer pool 116 may include items such as: Rate; CWT; Density; Weight; Volume; Leadtime, i.e., (LAT—date created); number of Pieces; Freighter/Belly Route; number of Stops; Customer Industry; Customer Size; Customer Relationship Type; Customer Wallet Share; DOW; Product Code (Fresh, Express, etc.); Special Handling Flags (Large, Heavy, etc.); Seasonality Index (score of CWT demand relative to average); Seasonality Index (score of revenue demand relative to average); Seasonality Index (score of number of orders demand relative to average); Historical Customer W/L; Historical Customer Pricing in market; Historical Customer Pricing overall; Shipper Capacity Share against Market; Average price quoted to customer in market; Average price quoted to customer overall; Flexibility (LAT—ready on date); Customer percent (%) Revenue through spot market (OD); Customer % CWT through spot market (OD); Customer % Revenue through spot market (overall); Customer % CWT through spot market (overall). From a number of such potential influencers, the price influencer ranking and selection component 104 may sort through and find the influencers that matter in each market. Machine learning algorithm such as LASSO regularization of a logistic regression implemented on a machine builds a model that determines the influencers, and another learning algorithm such as cross-validation calibrates the model.

Price elasticity computation 106 may include a win probability model that fits appropriate price elasticity curve for each subgroup of quotes in each route by estimating likelihood to win for multiple routes. A curve is fit according to the Multinomial Logit choice model with quote outcome as the response variable and rate as a parameter along with each of the price influencers selected in 104. This takes the form $P_{ijck}(\hat{\beta}_{ijc}) = e^{\hat{X}_{ijck}\hat{\beta}_{ijc}}/(1+e^{\hat{X}_{ijck}\hat{\beta}_{ijc}})$, where $P_{ijck}$ is the predicted win probability for quote k in segment c of the origin-destination pair ij, $\hat{X}_{ijck}$ and $\hat{\beta}_{ijc}$ contains quote characteristics and model coefficients for quote k, restricted to the set of price influencers selected previously for segment c.

Price optimization 108 finds prices of all possible routes that maximize expected revenue contingent on network traffics by generating algorithms to find maximum value for revenue win probability with penalty for heavy traffic. After fitting the coefficients in 106, the win probability curve $P_{ijck}(\beta_{ijc})$ is rewritten as $P_{ijck}(r_k)$ to depend only on the rate $r_k$. Optimization at 108 chooses $r_k$ to maximize a function $r_k P_{ijck}(r_k)$. This gives a revenue-maximizing price, which may then be adjusted up or down to account for over or under-utilization of the route being priced. In one aspect, the price optimization 108 may be triggered based on receiving a quote request 112. Receiving a quote request 112 may trigger execution of a quote dispatcher 114 on a hardware processor, which may invoke the price optimization 108.

Figure 3A:
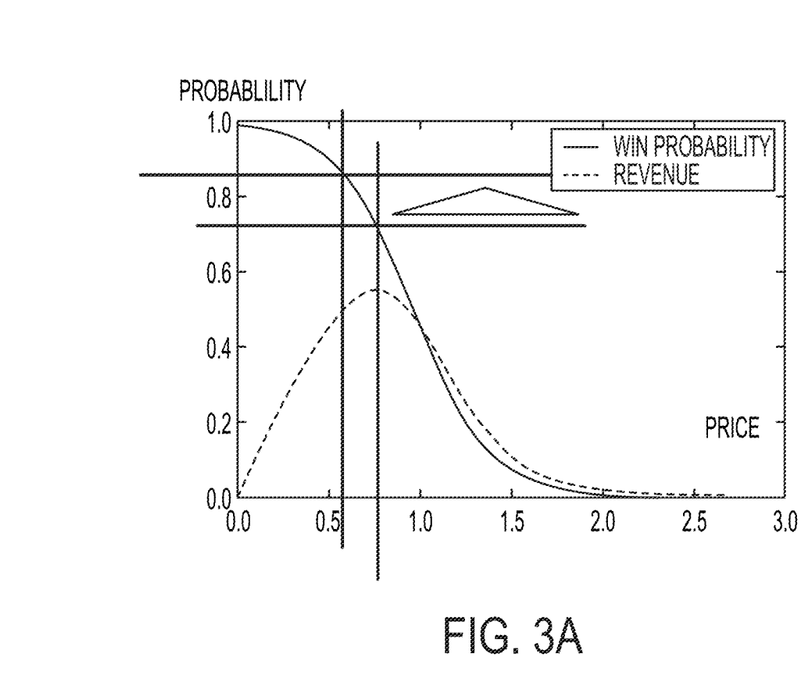
FIGS. 3A and 3B show examples of load adjusted price optimization in one embodiment of the present disclosure.
Figure 3B:
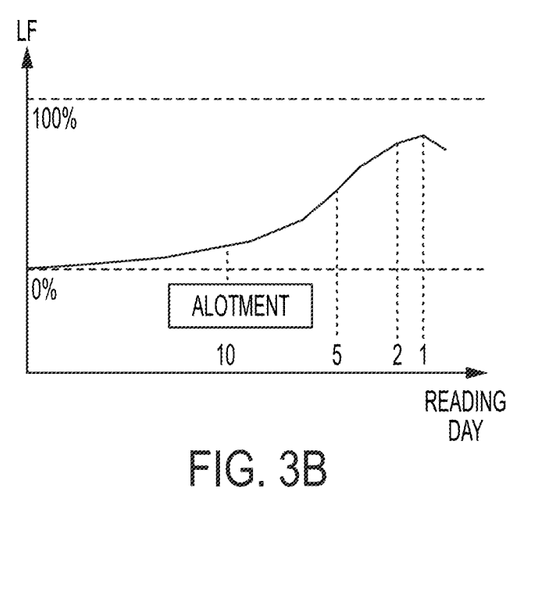

FIGS. 3A and 3B show examples of load-adjusted price optimization in one embodiment of the present disclosure. In FIG. 3A, the rightmost vertical bar passes through the revenue curve at the optimal point, and the lower horizontal bar indicates the optimal win probability is 70% with adjustments for load. In FIG. 3B, a load curve indicates % of capacity reserved, with days until departure on the x-axis. If load falls too low at any point, the load can be increased by a shift of win probability to a level above the unadjusted optimal. The leftmost and upper bars on FIG. 3A indicate the rate and win probability associated with such a shift. Here the win probability jumps to 85% at a new, lower price. An example use case may include utilization and load curve including definition of ideal and historical load curve, definition of feasible corridor, adjustment of win probability (price) whenever corridor is violated. An adjustment may be made via a business rule. Business rules, for example, may be stored in a database of special rules (e.g., FIG. 1, 110). An example of a business rule may include, "−10% load→(implies) 85% win probability". For instance, the provider may attempt to balance load by adjusting targeted win probability. For example, if the load is 10% below target level, the provider offers low prices that correspond to a high, 85% win probability until the load is raised to the desired level. An adjustment may be made via calculation. An example of a calculation may include "reach 85% load at departure (DEP)". For example, the method in one embodiment of the present disclosure calculates its own target win probabilities in order to achieve the desired 85% load at departure. This is based on a predicted pattern of future arrivals from the current time up until departure.

Figure 4:
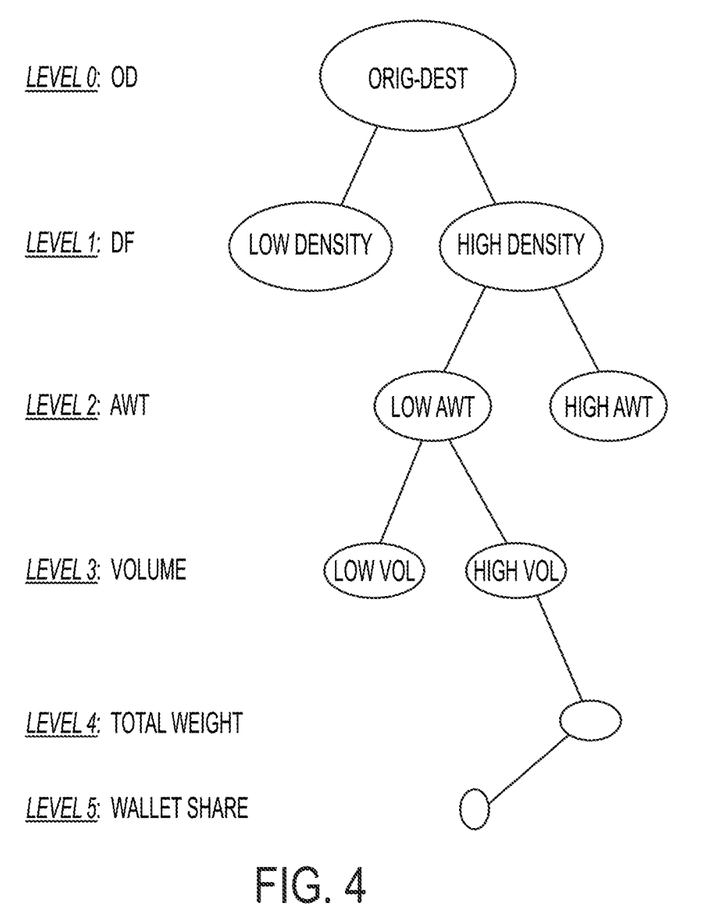
FIG. 4 shows different levels of quote classification in one embodiment of the present disclosure in determining spot pricing.

In one embodiment, the variable selection at 104, price elasticity estimation at 106 and price optimization at 108 may be performed iteratively, with the rules for segmenting quotes updated before each iteration. During each iteration, an alternative segmentation rule is tested and evaluated based on the outcomes of the variable selection, price elasticity and price optimization. The alternative rule is implemented if it results in improvement in the result, for example, producing reasonable optimal prices, better prediction and better revenue. The procedure stops when no improvements are possible within the context of a predefined set of allowable segmentation rules. FIG. 4 shows different levels of iteration in one embodiment of the present disclosure in determining spot pricing. In the case of FIG. 4, alternate segmentations may be created by adding or collapsing nodes of a decision tree. The solution shown in FIG. 4 contains segmentation rules based on the density, weight (AWT), and volume (VOL) of a quote.

Referring back to FIG. 1, the output 128 of the processing of the analytics components may include optimal pricing, price influencer breakdown, what-if calculator, and quote segment dashboard. Optimal pricing entails a display of the optimal rate to charge for each feasible routing of the quote. Price influencer breakdown provides diagnostic output to the pricing agent that explains the influencers with the biggest impact on price for this quote. What-if calculator allows the pricing agent to create alternate quotes by varying certain elements and observe the resulting change in optimal rate. Quote segment dashboard provides information on the segment of quotes within which the quote was placed and how the quote compares to the segment as a whole with respect to key price influencers.

The system of the present disclosure in one embodiment provides for a joint price optimization for multiple routes contingent on the network traffic; clustering OD routes based on the global market competitiveness; a hierarchical segmentation considering selected cargo features; a quote win probability model responding to automatically selected price influencers such as physical dimension, special handling requirement, and/or others; and an automatically adaptive feedback system to integrate segmentation and pricing models. In one embodiment, the system may price each route based on the network traffic to achieve global pricing optimization balancing demand and capacity through the network; enable real-time differentiated pricing strategy for a variety of cargo services for each local market, incorporating unique inputs such as regional competition mapping, customer's wallet shares, seasonality, routes, and/or other criteria, to provide better global market splits.

In one aspect, the price automation of the present disclosure may be based on statistical modeling and price optimization. Quote complexity may include price differentiation in physical dimensions and other cargo properties (e.g., special handling and date flexibility). Global scaling may be enabled via automated calibration and model selection for large (e.g., 30,000) OD network and multiple routes for each OD.

Product segmentation may include quotes segmented by cargo physics and client relationship. An iterative algorithm balances complexity and data availability in partitioning complex product space. OD market clustering integrates two methods to segment OD pairs, and for example, characterizes market competitiveness. Demand shaping through network may include pricing multiple routes to maximize the expected revenue with the penalty for heavy traffic.

The method of the present disclosure in one embodiment, for example, in providing a logistics service, may simultaneously determine optimal prices of multiple shipping routes for a request-for-quote (RFQ) of logistic services. In one embodiment, a hierarchical co-clustering method is applied to cluster a large number (e.g., thousands) of OD pairs in the network, which considers both geographic and market conditions. In each cluster, a learning algorithm is used to further segment cargo services based on their attributes and service requirement. For example, the processes at 104, 106,

108 are iteratively performed for improving the result, and for example, as shown in FIG. 4. In one embodiment, a service requirement is a factor considered in the clustering and pricing module. For example, pricing solutions may be provided for all the proposed routes of logistic services. In one aspect, the method may calibrate the impact of inventory status and capacity usage on the pricing decisions through the network. According to a method in one embodiment, a carrier such as an airline company who controls a network may be able to set the prices for all routes in the network. The method in one embodiment models price elasticity and optimizes spot prices at a global scale. The method may also model customer utility for each possible route so that a utility-maximizing and/or carrier profit-maximizing choice may be made for each quote. In one embodiment, a demand model may be learned from actual data.

Figure 6:
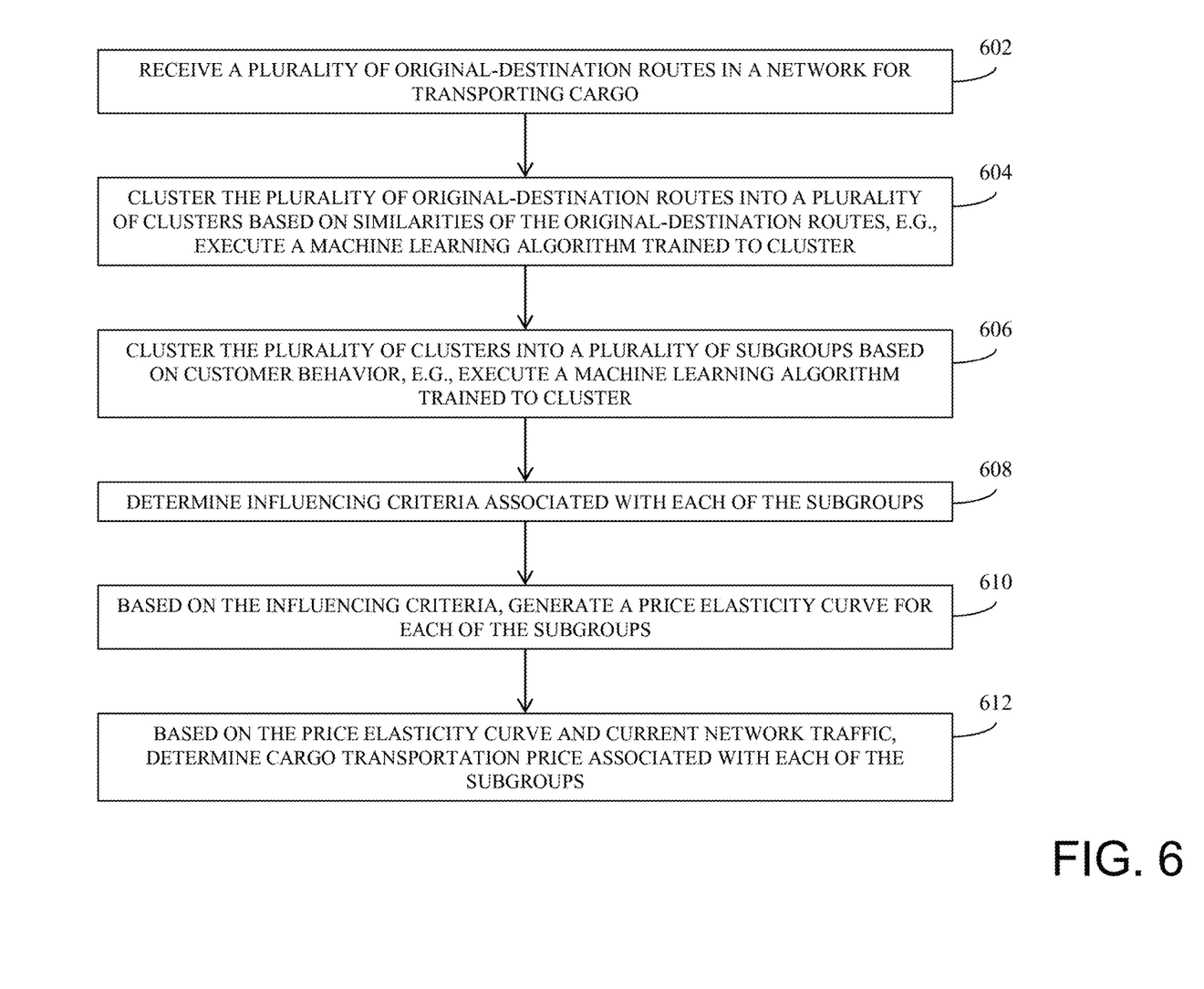
FIG. 6 is a flow diagram showing a method in one embodiment of the present disclosure.

FIG. 6 is a flow diagram showing a method in one embodiment of the present disclosure. At 602, a plurality of original-destination routes in a network for transporting cargo may be received. At 604, the plurality of original-destination routes are clustered into a plurality of clusters based on similarities of the original-destination routes. At 606, the plurality of clusters are clustered or grouped into a plurality of subgroups based on customer behavior. In one embodiment, a machine learning algorithm is trained to learn to perform the clustering and the steps of clustering are performed by executing the machine learning algorithm. An example is a co-clustering algorithm described with reference to FIG. 1 at 102.

At 608, price influencers, e.g., also referred to as influencing criteria, associated with each of the subgroups are determined, for example, as described above with reference to FIG. 1 at 104. In one embodiment, this may be done using LASSO regularization of a logistic regression model and model parameters are calibrated using cross-validation.

At 610, based on the influencing criteria, a price elasticity curve for each of the subgroups is generated, for example, as described above with reference to FIG. 1 at 106. In one embodiment, the curve is estimated using maximum likelihood estimation to fit a multinomial logit choice model.

At 612, based on the price elasticity curve and current network traffic, cargo transportation price associated with each of the subgroups may be determined. For example, as described above, an optimization function may be executed that maximizes revenue and win probability of a price quote with a penalty for heavy traffic.

In one aspect, the method may generate a confidence score during the price elasticity estimation step, and this may also depend on the price optimization results. The elasticity estimation procedure produces measures of statistical confidence, e.g., the predicted accuracy of the model and the p-value associated with the rate term in the regression that fits the win probability curve. This is combined with rules-based checks on the suggested optimal prices and projected revenue gains to assign an overall confidence score to the model.

The method and system in one embodiment of the present disclosure may improve on existing computer technology for cargo pricing by adding automation that enables the computer to recommend optimal prices for all routes in a network. This improves on existing systems which can capture pricing data but does not generate and provide optimal prices. In some cases, the technology of the present disclosure may be used as part of a system of devices that tracks the current state of the logistic network. Tracking data may include the location of vehicles and/or specific loads. The method and system in one embodiment improves on existing tracking technology by continually observing load in the network and determining optimal prices for requested routes in real time based on network state. In this way, the system goes beyond tracking to include capabilities for dynamically balancing load in the network through optimal spot pricing. The method and system may thus include dynamically balancing load in a logistic network transporting cargo.

Figure 7:
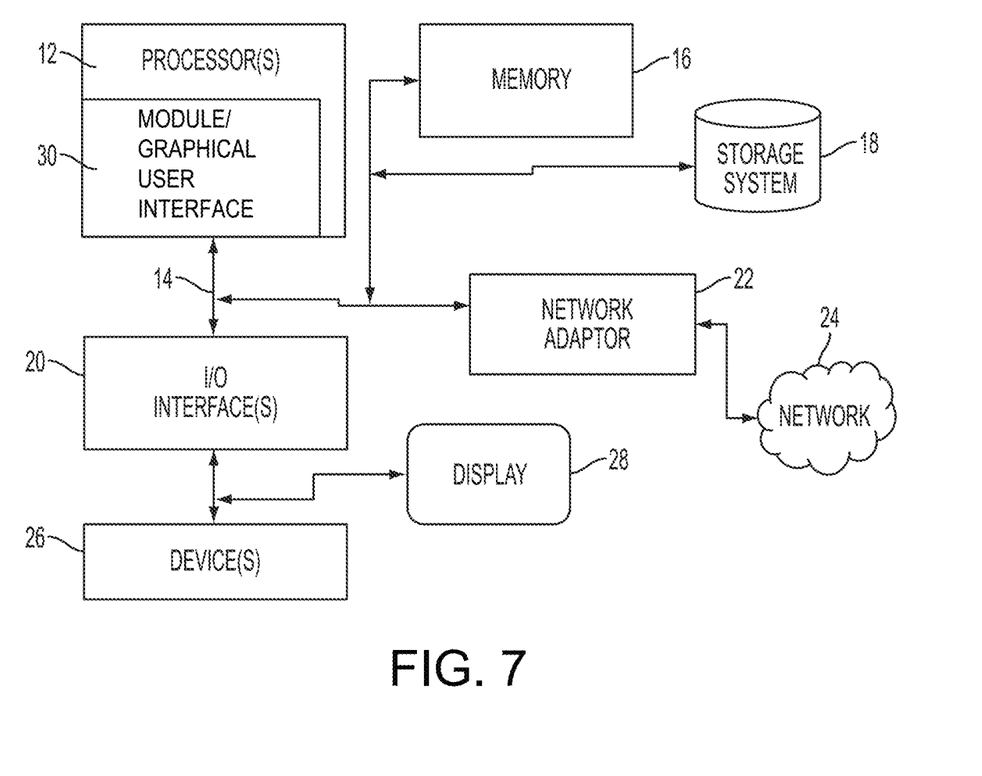
FIG. 7 illustrates a schematic of an example computer or processing system that may implement a cargo logistics service system in one embodiment of the present disclosure.

FIG. 7 illustrates a schematic of an example computer or processing system that may implement a cargo logistics service system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others.

Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of training a machine to automate spot pricing of logistics services, the method performed by at least one hardware processor, comprising:
   receiving a plurality of original-destination routes in a network for transporting cargo;
   clustering the plurality of original-destination routes into a plurality of clusters based on similarities of the original-destination routes;
   clustering the plurality of clusters into a plurality of subgroups based on customer related factors,
   wherein the clustering the plurality of clusters is performed based on training the machine to learn a computer-implemented decision tree model and a computer-implemented regression model, and by merging execution of the learned decision tree model and the learned regression model to create an interplay between segmentation and regression;
   determining influencing factors associated with each of the subgroups;
   based on the influencing factors, generating a price elasticity curve for each of the subgroups;
   based on the price elasticity curve and current network traffic, determining cargo transportation price associated with each of the subgroups; and
   dynamically balancing load in air traffic network in real-time via providing the cargo transportation price.

2. The method of claim 1, wherein the regression model models a logit function as a function of a first parameter representing common effects on cargo attributes multiplied by a vector of attributes for quote k, a second parameter representing origin-destination pair effect multiplied by an indicator value mapping k to the origin-destination pair, and a random noise term.

3. The method of claim 1, wherein the cargo transportation price is determined for each of the subgroups simultaneously.

4. The method of claim 1, wherein the influencing factors comprise at least one of rate, chargeable weight (CWT), density, weight, volume, leadtime, number of pieces, freighter route, number of stops, customer industry, customer size, customer relationship type, customer wallet share, DOW, product code, special handling flag, seasonality, historical customer win or loss factor, historical customer pricing in market, historical customer pricing overall, shipper capacity share against market, average price quoted to customer in market, average price quoted to customer overall, flexibility, customer percent (%) revenue through spot market, and customer % CWT through spot market.

5. The method of claim 4, wherein the influencing factors are correlated.

6. The method of claim 1, wherein the determination of the cargo transportation price comprises executing an optimization function that maximizes revenue and win probability of a price quote with a penalty for heavy traffic.

7. The method of claim 1, further comprising iterating the determining of the influencing factors, generating of the price elasticity curve, and the determining of the cargo transportation price.

8. A system comprising:
   a hardware processor;
   a memory device operably coupled with the hardware processor;
   the hardware processor operable to at least:
      receive a plurality of original-destination routes in a network for transporting cargo;
      cluster the plurality of original-destination routes into a plurality of clusters based on similarities of the original-destination routes;
      cluster the plurality of clusters into a plurality of subgroups based on customer related factors,
      wherein the hardware processor clusters the plurality of clusters at least based on training a machine to learn a computer-implemented decision tree model and a computer-implemented regression model, and by merging execution of the learned decision tree model and the learned regression model to create an interplay between segmentation and regression, the learned decision tree model and the learned regression model stored on the memory device;

determine influencing factors associated with each of the subgroups;

based on the influencing factors, generate a price elasticity curve for each of the subgroups;

based on the price elasticity curve and current network traffic, determine cargo transportation price associated with each of the subgroups; and dynamically balancing load in air traffic network in real-time via providing the cargo transportation price.

9. The system of claim 8, wherein the regression model models a logit function as a function of a first parameter representing common effects on cargo attributes multiplied by a vector of attributes for quote k, a second parameter representing origin-destination pair effect multiplied by an indicator value mapping k to the origin-destination pair, and a random noise term.

10. The system of claim 8, wherein the cargo transportation price is determined for each of the subgroups simultaneously.

11. The system of claim 8, wherein the influencing factors comprise at least one of rate, chargeable weight (CWT), density, weight, volume, leadtime, number of pieces, freighter route, number of stops, customer industry, customer size, customer relationship type, customer wallet share, DOW, product code, special handling flag, seasonality, historical customer win or loss factor, historical customer pricing in market, historical customer pricing overall, shipper capacity share against market, average price quoted to customer in market, average price quoted to customer overall, flexibility, customer percent (%) revenue through spot market, and customer % CWT through spot market.

12. The system of claim 11, wherein the influencing factors are correlated.

13. The system of claim 8, wherein the hardware processor is operable to determine the cargo transportation price by at least executing an optimization function that maximizes revenue and win probability of a price quote with a penalty for heavy traffic.

14. The system of claim 8, wherein the hardware processor is operable to iterate determining of the influencing factors, generating of the price elasticity curve, and determining of the cargo transportation price.

15. A computer program product comprising a computer readable storage medium having program instructions embodied therewith, the program instructions executable by a device to cause the device to:

receive a plurality of original-destination routes in a network for transporting cargo;

cluster the plurality of original-destination routes into a plurality of clusters based on similarities of the original-destination routes;

cluster the plurality of clusters into a plurality of subgroups based on customer related factors, wherein the device is caused to cluster the plurality of clusters at least based on training a machine to learn a computer-implemented decision tree model and a computer-implemented regression model, and by merging execution of the learned decision tree model and the learned regression model to create an interplay between segmentation and regression, the learned decision tree model and the learned regression model stored in the memory device;

determine influencing factors associated with each of the subgroups;

based on the influencing factors, generate a price elasticity curve for each of the subgroups;

based on the price elasticity curve and current network traffic, determine cargo transportation price associated with each of the subgroups; and dynamically balancing load in air traffic network in real-time via providing the cargo transportation price.

16. The computer program product of claim 15, wherein the regression model models a logit function as a function of a first parameter representing common effects on cargo attributes multiplied by a vector of attributes for quote k, a second parameter representing origin-destination pair effect multiplied by an indicator value mapping k to the origin-destination pair, and a random noise term.

17. The computer program product of claim 15, wherein the cargo transportation price is determined for each of the subgroups simultaneously.

18. The computer program product of claim 15, wherein the influencing factors comprise at least one of rate, chargeable weight (CWT), density, weight, volume, leadtime, number of pieces, freighter route, number of stops, customer industry, customer size, customer relationship type, customer wallet share, DOW, product code, special handling flag, seasonality, historical customer win or loss factor, historical customer pricing in market, historical customer pricing overall, shipper capacity share against market, average price quoted to customer in market, average price quoted to customer overall, flexibility, customer percent (%) revenue through spot market, and customer % CWT through spot market.

19. The computer program product of claim 15, wherein the influencing factors are correlated.

20. The computer program product of claim 15, wherein the device is caused to determine the cargo transportation price by at least executing an optimization function that maximizes revenue and win probability of a price quote with a penalty for heavy traffic.

* * * * *